United States Patent
Sheehan et al.

(10) Patent No.: US 8,892,421 B2
(45) Date of Patent: Nov. 18, 2014

(54) COMPUTER-IMPLEMENTED SYSTEMS AND METHODS FOR DETERMINING A DIFFICULTY LEVEL OF A TEXT

(75) Inventors: Kathleen Marie Sheehan, Skillman, NJ (US); Irene Kostin, Princeton, NJ (US); Yoko Futagi, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 327 days.

(21) Appl. No.: 13/313,372

(22) Filed: Dec. 7, 2011

(65) Prior Publication Data

US 2012/0150534 A1 Jun. 14, 2012

Related U.S. Application Data

(60) Provisional application No. 61/421,065, filed on Dec. 8, 2010.

(51) Int. Cl.
*G06F 17/27* (2006.01)
*G09B 19/06* (2006.01)

(52) U.S. Cl.
CPC .............. *G06F 17/274* (2013.01); *G09B 19/06* (2013.01)
USPC .......................... 704/9; 707/7; 707/8; 707/257

(58) Field of Classification Search
CPC ... G06F 17/271; G06F 17/274; G06F 17/277; G06F 17/2755; G06F 17/2785; G10L 15/183; G10L 15/1822
USPC .................................................. 704/7–9, 257
See application file for complete search history.

(56) References Cited

U.S. PATENT DOCUMENTS

| | | | | |
|---|---|---|---|---|
| 6,817,715 | B2* | 11/2004 | Leinonen | 351/222 |
| 8,036,464 | B2* | 10/2011 | Sridhar et al. | 382/177 |
| 8,155,963 | B2* | 4/2012 | Aaron et al. | 704/260 |
| 8,265,925 | B2* | 9/2012 | Aarskog | 704/9 |
| 2003/0040899 | A1* | 2/2003 | Ogilvie | 704/2 |
| 2003/0103192 | A1* | 6/2003 | Leinonen | 351/237 |
| 2009/0067719 | A1* | 3/2009 | Sridhar et al. | 382/176 |
| 2009/0197225 | A1* | 8/2009 | Sheehan et al. | 434/169 |
| 2010/0037132 | A1* | 2/2010 | LoPucki | 715/269 |

FOREIGN PATENT DOCUMENTS

WO 2009/097547 A1 8/2009

OTHER PUBLICATIONS

Baretta, Luciane, Tomitch, Leda M.B., MacNair, Nicolas, Lim, Vanessa, Waldie, Karen; Inference Making While Reading Narrative and Expository Texts: An ERP Study; Psychology & Neuroscience, 2(2); pp. 137-145; 2009.

Barzilay, Regina, Elhadad, Michael; Using Lexical Chains for Text Summarization; Proceedings of the Intelligent Scalable Text Summarization Workshop (ISS-97); Madrid, Spain; 1997.

(Continued)

*Primary Examiner* — Leonard Saint Cyr
(74) *Attorney, Agent, or Firm* — Jones Day

(57) ABSTRACT

Systems and methods are provided for determining a difficulty level of a text. A determination is made as to a number of cohesive devices present in a text. A further determination is made as to a number of cohesive devices expected in the text. A cohesiveness metric is calculated based on the number of cohesive devices present in the text and the number of cohesive devices expected in the text, where the cohesiveness metric is used to identify a difficulty level of the text.

21 Claims, 14 Drawing Sheets

(56) References Cited

OTHER PUBLICATIONS

Beck, Isabel, McKeown, Margaret, Worthy, Jo; Giving a Text Voice Can Improve Students' Understanding; Reading Research Quarterly, 30(2); pp. 220-238; 1995.

Best, Rachel, Floyd, Randy, McNamara, Danielle; Understanding the Fouth-Grade Slump: Comprehension Difficulties as a Function of Reader Aptitudes and Text Genre; Paper presented at American Educational Research Association, San Diego, CA; 2004.

Britton, Bruce; Gulgoz, Sami; Using Kintsch's Computational Model to Improve Instructional Text: Effects of Repairing Inference Calls on Recall and Cognitive Structures; Journal of Educational Psychology, 83(3); pp. 329-345; 1991.

Carver, Ronald; Measuring Readability Using DRP Units; Journal of Reading Behavior, 17(4); pp. 303-316; 1985.

Crossley, Scott, Greenfield, Jerry, McNamara, Danielle; Assessing Text Readability Using Cognitively Based Indicies; TESOL Quarterly, 42(3); pp. 475-493; 2008.

Dale, Edgar, Chall, Jeanne; A Formula for Predicting Readability; Educational Research Bulletin, 27; pp. 11-20; 1948.

Davidson, Alice, Kantor, Robert; On the Failure of Readability Formulas to Define Readable Text: A Case Study From Adaptations; Reading Research Quarterly, 17(2); pp. 187-209; 1982.

DuBay, William; The Principles of Readability; Impact Information, Costa Mesa, California; 2004.

Graesser, Arthur, McNamara, Danielle, Louwerse, Max, Cai, Zhiciiang; Coh-Metrix: Analysis of Text on Cohesion and Language; Behavior Research Methods, Instruments & Computers, 36(2); pp. 193-202; 2004.

Holland, V. Melissa; Psycholinguistic Alternatives to Readability Formulas; American Institutes for Research; 1981.

Kincaid, J. Peter, Fishburne, Robert, Rogers, Richard, Chissom, Brad; Derivation of New Readability Formulas (Automated Readability Index, Fog Count and Flesch Reading Ease Formula) for Navy Enlisted Personnel; Research Report 8-75; Naval Air Station, Memphis, TN; 1975.

Klare, George; Readability; Ch. 22, Handbook of Reading Research, P. D. Pearson (Ed.); Longman: New York, NY; pp. 681-744; 1984.

Kukan, Linda, Beck, Isabel; Thinking Aloud and Reading Comprehension Research: Inquiry, Instruction, and Social Interaction; Review of Educational Research, 67(3); pp. 271-299; 1997.

Lee, David Y.W.; Defining Core Vocabulary and Tracking Its Distribution Across Spoken and Written Genres; Journal of English Linguistics, 29(3); pp. 250-278; 2001.

Lennon, Colleen, Burdick, Hal; the Lexile Framework as an Approach for Reading Measurement and Success; Metametrics, Inc.; 2004.

McNamara, Danielle, Louwerse, Max, McCarthy, Philip, Graesser, Arthur; Coh-Metrix: Capturing Linguistic Features of Cohesion; Discourse Processes, 47; pp. 292-330; 2010.

Mislevy, Robert; Cognitive Psychology and Educational Assessment; Ch. 8, Educational Measurement, 4th Edition, R. Brennan (Ed.); Praeger Publishers: Westport, CT; pp. 257-305; 2006.

Morris, Jane, Hirst, Graeme; Lexical Cohesion Computed by Thesaural Relations as Indicators of the Structure of Text; Computational Linguistics, 18(1); pp. 21-45; 1991.

Pearson, P. David, Hamm, Diane; The Assessment of Reading Comprehension: A Review of Practices—Past, Present and Future; Ch. 2, Children's Reading Comprehension and Assessment, S. Paris and S. Stahl (Eds.); Lawrence Erlbaum Associates: Mahwah, NJ; pp. 13-70; 2005.

Sheehan, Kathleen, Kostin, Irene, Futagi, Yoko, Flor, Michael; Generating Automated Text Complexity Classifications That Are Aligned with Targeted Text Complexity Standards; ETS Research Report RR-10-28; Princeton, NJ; 2010.

Sheehan, Kathleen, Kostin, Irene, Futagi, Yoko; When Do Standard Approaches for Measuring Vocabulary Difficulty, Syntactic Complexity and Referential Cohesion Yield Biased Estimates of Text Difficulty?; Proceedings of the 30th Annual Meeting of the Cognitive Science Society; Washington, DC; pp. 1978-1983; 2008.

Sheehan, Kathleen, Kostin, Irene, Futagi, Yoko; Reading Level Assessment for High-Stakes Testing Applications: A Second Look at Variation Due to Differences in Text Genre; Presented at the Annual Meeting of the Society for Text and Discourse; Memphis, TN; 2008.

Stenner, A. Jackson, Horabin, Ivan, Smith, Dean, Smith, Malbert; Most Comprehension Tests Do Measure Reading Comprehension: A Response to McLean and Goldstein; Phi Delta Kappan; pp. 765-767; 1988.

van den Broek, Paul, Virtue, Sandra, Everson, Michelle, Tzeng, Yuhtsuen, Sung, Yung-chi; Comprehension and Memory of Science Texts: Inferential Processes and the Construction of a Mental Representation; Ch. 6, The Psychology of Science Text Comprehension, J. Otero, J. Leon, & A. Graesser (Eds.); Lawrence Erlbaum Associates: Mahwah, NJ; pp. 131-154; 2002.

Zabrucky, Karen, Moore, DeWayne; Influence of Text Genre on Adults' Monitoring of Understanding and Recall; Educational Gerontology, 25; pp. 691-710; 1999.

* cited by examiner

COMPUTER-IMPLEMENTED SYSTEMS AND METHODS FOR DETERMINING A DIFFICULTY LEVEL OF A TEXT

This application claims the benefit of U.S. Provisional Patent Application No. 61/421,065 filed on Dec. 8, 2010, the entire contents of which are incorporated herein by reference.

TECHNICAL FIELD

This document relates generally to text analysis and more particularly to determining a difficulty level of a text.

BACKGROUND

The Common Core State Standards (CCSS) for English Language Arts have at their center the notion that students should be challenged to read texts at steadily increasing complexity levels as they progress through school so that all students remain on track to handle the more advanced reading demands of college and careers. An automated measure of text complexity can help educators achieve this goal. For example, the Common Core State Standards note that more precise, more accurate, and easier-to-use tools are urgently needed to help make text complexity a vital, everyday part of classroom instruction and curriculum planning. To address this challenge, the present inventors have observed that an automated text analysis tool could help teachers accomplish key instructional objectives such as identifying texts that are within a student's zone of proximal development and helping students define reasonable learning targets.

SUMMARY

In accordance with the teachings herein, systems and methods are provided for determining a difficulty level of a text. A determination is made as to a number of cohesive devices present in a text. A further determination is made as to a number of cohesive devices expected in the text. A cohesiveness metric is calculated based on the number of cohesive devices present in the text and the number of cohesive devices expected in the text, where the cohesiveness metric is used to identify a difficulty level of the text.

As another example, a system for determining a difficulty level of a text may include a processing system and one or more memories encoded with instructions for commanding the one or more data processors to execute a method. In the method, a determination is made as to a number of cohesive devices present in a text. A further determination is made as to a number of cohesive devices expected in the text. A cohesiveness metric is calculated based on the number of cohesive devices present in the text and the number of cohesive devices expected in the text, where the cohesiveness metric is used to identify a difficulty level of the text.

As a further example, a computer-readable medium may be encoded with instructions for commanding one or more data processors to execute a method. In the method, a determination is made as to a number of cohesive devices present in a text. A further determination is made as to a number of cohesive devices expected in the text. A cohesiveness metric is calculated based on the number of cohesive devices present in the text and the number of cohesive devices expected in the text, where the cohesiveness metric is used to identify a difficulty level of the text.

DETAILED DESCRIPTION

Figure 1:
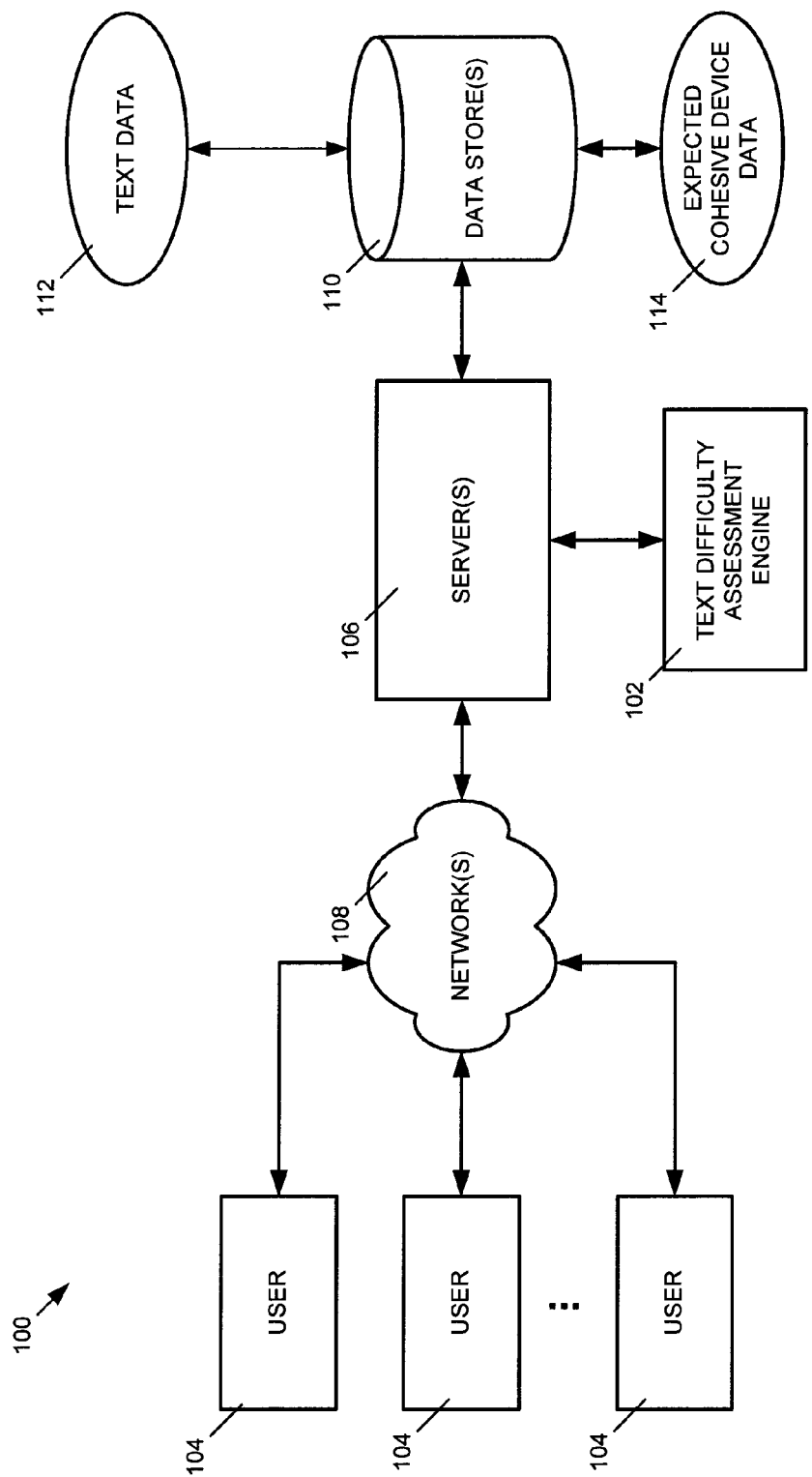
FIG. 1 is a block diagram depicting a computer-implemented text difficulty assessment engine.

FIG. 1 is a block diagram depicting a computer-implemented text difficulty assessment engine. A computer processing system implementing a text difficulty assessment engine 102 (e.g., via any suitable combination of hardware, software, firmware, etc.) facilitates the automated estimation of a difficulty of a given text, such as a book, magazine article, periodical, short story, or paragraph. By determining a difficulty level associated with a text, that text can be targeted to an appropriate audience. For example, a book could be analyzed to determine a grade level difficulty. Using the determined grade level difficulty for the book, the book can then be assigned as a reading assignment to an associated set of students. As another example, an informational article may be analyzed to determine a difficulty level. Upon determination of the difficulty level, excerpts from the informational article may be used as part of an exam, such as the basis for a set of reading comprehension questions on a high stakes exam.

Figure 2:
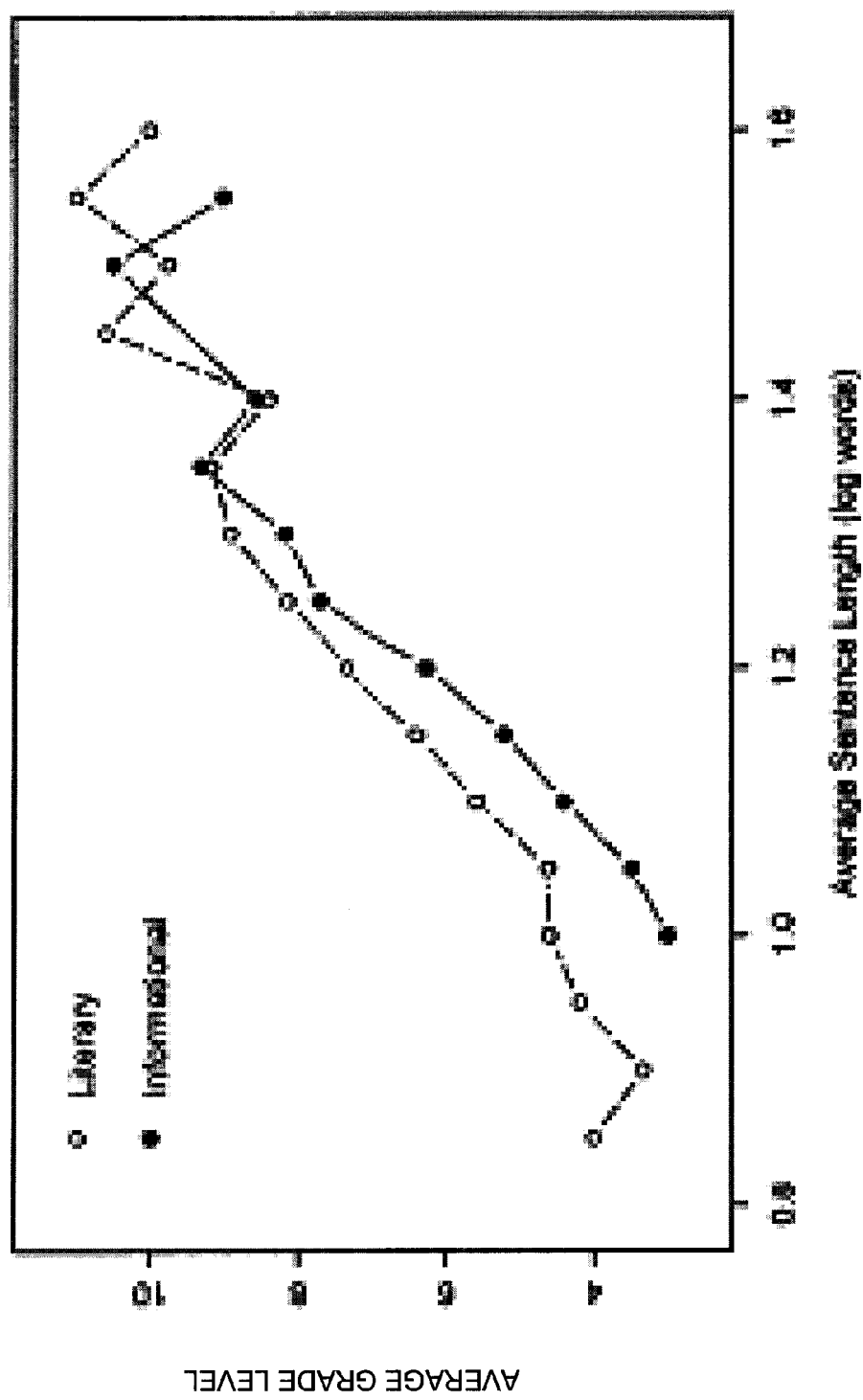
FIG. 2 is a graph illustrating a correlation between sentence length and an average grade level difficulty of a text.

The text difficulty assessment engine 102 may determine a difficulty level of a text by analyzing one or more features of the text. Certain features of a text tend to be correlated with a difficulty level of a text. FIG. 2 is a graph illustrating a correlation between sentence length and an average grade level difficulty of a text. The average sentence length of a text is plotted on the x-axis in a log scale, and the associated average grade level is plotted on the y-axis. The graph of FIG. 2 illustrates that, for both literary and informational texts, sentence length tends to correlate with difficulty of the text, where longer sentences are typically indicative of more difficult texts. Many other features of a text may be analyzed to determine a difficulty level of a text including levels of cohesiveness in the text and vocabulary included in the text. These features may be used individually or in combination to determine a difficulty of a text.

With reference back to FIG. 1, the text difficulty assessment engine 102 provides a platform for users 104 to determine a difficulty level of a text. A user 104 accesses the text difficulty assessment engine 102, which is hosted via one or more servers 106, via one or more networks 108. The one or more servers 106 communicate with one or more data stores

110. The one or more data stores 110 may contain a variety of data that includes text data 112 and expected cohesive device data 114.

As noted above, levels of cohesiveness in a text provide a feature that can be analyzed and used to determine a difficulty level of a text. Two measures of cohesion can be used in providing automated text difficulty assessment: causal cohesion and referential cohesion. Causal cohesion refers to the degree to which causal relationships are explicitly stated in a text. For example, causal cohesive devices may be identified based on their use of connectives such as because, therefore, and consequently. Referential cohesion refers to the degree to which words, phrases, or concepts are repeated across a text. When causal or referential cohesion are low, additional inferencing may be needed to establish required connection, thus making the process of creating an accurate mental model of the situation presented in a text more difficult.

As referred to herein, cohesive devices refer to words or phrases in a text that provide association in meaning between previous statements and subsequent statements in the text. Examples of cohesive devices can include causal cohesion words and phrases such as because, therefore, consequently, based on, as a result of, in particular, or referential cohesion repetitions, but it will be appreciated that such cohesive devices are not limited to these examples.

Levels of causal and referential cohesion in a text can be determined in several different ways. For example, a measure of causal cohesion in a text can be determined by identifying the frequency of causal devices in the text (e.g., because, therefore, and consequently). Another measure of referential cohesion can be devised by determining the proportion of times that words in a sentence "i" were also present in one or more previous sentence (e.g., a lexical overlap). Identification of referential cohesion devices can be automated by iterating through each sentence in a text and comparing the words of the current sentence i with the words of previous sentences (e.g., sentence i−1, sentence i−2). When the current sentence i includes a word that appears in one of the reviewed prior sentences, then the current sentence i is noted as including a referential cohesion device (e.g., the current sentence i is included in a count of a total number of sentences that includes such a cohesion device).

Variations of this counting method may alternatively be used. For example, certain common words, such as prepositions, conjunctions, and articles (e.g., and, but, or, the), that are not likely related to referential cohesion may be ignored when identifying cohesive devices. As another example, a stemming operation may be performed on words of the current sentence i and prior sentences being compared to avoid missing identification of cohesive devices based on differences in endings or tense between sentences (e.g., puppy and puppies in consecutive sentences are identified as a cohesive device based on same root, "pupp-," identified by the stemming operation).

An average number of cohesive devices per sentence in a text, sometimes referred to as a stem overlap adjacent metric, can be calculated according to:

$$SOA = \frac{1}{n}\sum_{i=1}^{n} x_i,$$

where n is the number of sentences in the text, i is a present sentence, $x_i$ is a variable that takes the values $x_i=1$ when sentence i includes a cohesive device and $x_i=0$ when sentence i does not include a cohesive device, and SOA refers to the stem overlap adjacent metric.

Figure 3:
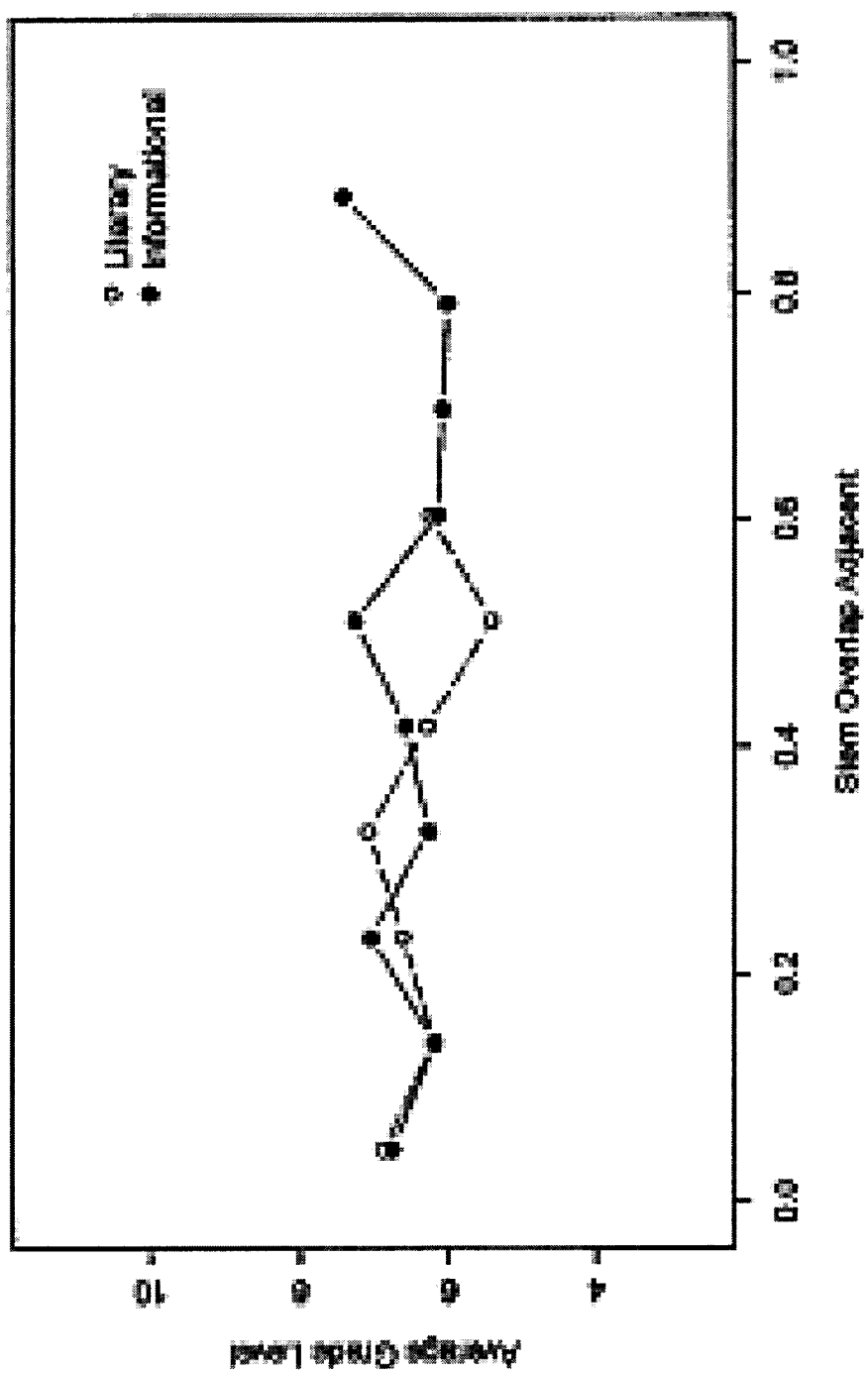
FIG. 3 is an example graph illustrating average grade levels according to average numbers of cohesive devices in a text, calculated using a stem overlap adjacent metric.

An average number of cohesive devices in a text does not, on its own, tend to exhibit a high degree of correlation with a difficulty level of the text. FIG. 3 is an example graph illustrating average grade level difficulty for a population of texts according to average numbers of cohesive devices in a text, calculated using the above described stem overlap adjacent metric. Because the average grade level remains near constant (flat) across the stem overlap adjacent values, one cannot meaningfully discern information about the difficulty of a text from the average number of cohesive devices per sentence. This result suggests that the presence of a backward reference in a text may not be an unambiguous signal of increased comprehension ease. Rather, an author may only elect to include backward references when the text under construction is expected to be confusing or otherwise difficult to comprehend, suggesting that, in addition to signaling increased comprehension ease, the presence of a backward reference may also be a signal of increased comprehension difficulty.

To improve determinations of difficulty levels of texts using cohesive device features, the above observations can be incorporated mathematically into the calculation of a cohesiveness metric. Instead of simply calculating an average number of cohesive devices present in a text, an adjusted cohesiveness metric normalizes the number of cohesive devices to identify whether the text is underweight or overweight with respect to the number of cohesive devices present. By comparing the number of cohesive devices present in a text with the number of cohesive devices expected in the text based on other features of the text, a more valid measure of the cohesiveness of a text may be obtained that exhibits a strong correlation to the difficulty level of the text.

The expected likelihood that a sentence $x_i$ will include a cohesive device can be modeled as:

$$E[x_i] = 0P(x_i=0) + 1P(x_i=1) = P(x_i=1) = p_i,$$

where $p_i$ represents the probability that an author will decide to include a backward reference in sentence i. Because this probability depends on the complexity of sentences i and i−1, the $p_i$ conditional is determined based on the number of words in sentences i and i−1. Thus, based on the number of words in a sentence i and preceding sentence i−1, an expected probability that sentence i will include a cohesive device can be determined. By comparing the total number of sentences in the text that include a cohesive device with the sum of probabilities that sentences will contain cohesive devices across the sentences in the text, a more meaningful cohesiveness metric is calculated that can be used to aid in determination of a difficulty level of a text.

Figure 4:
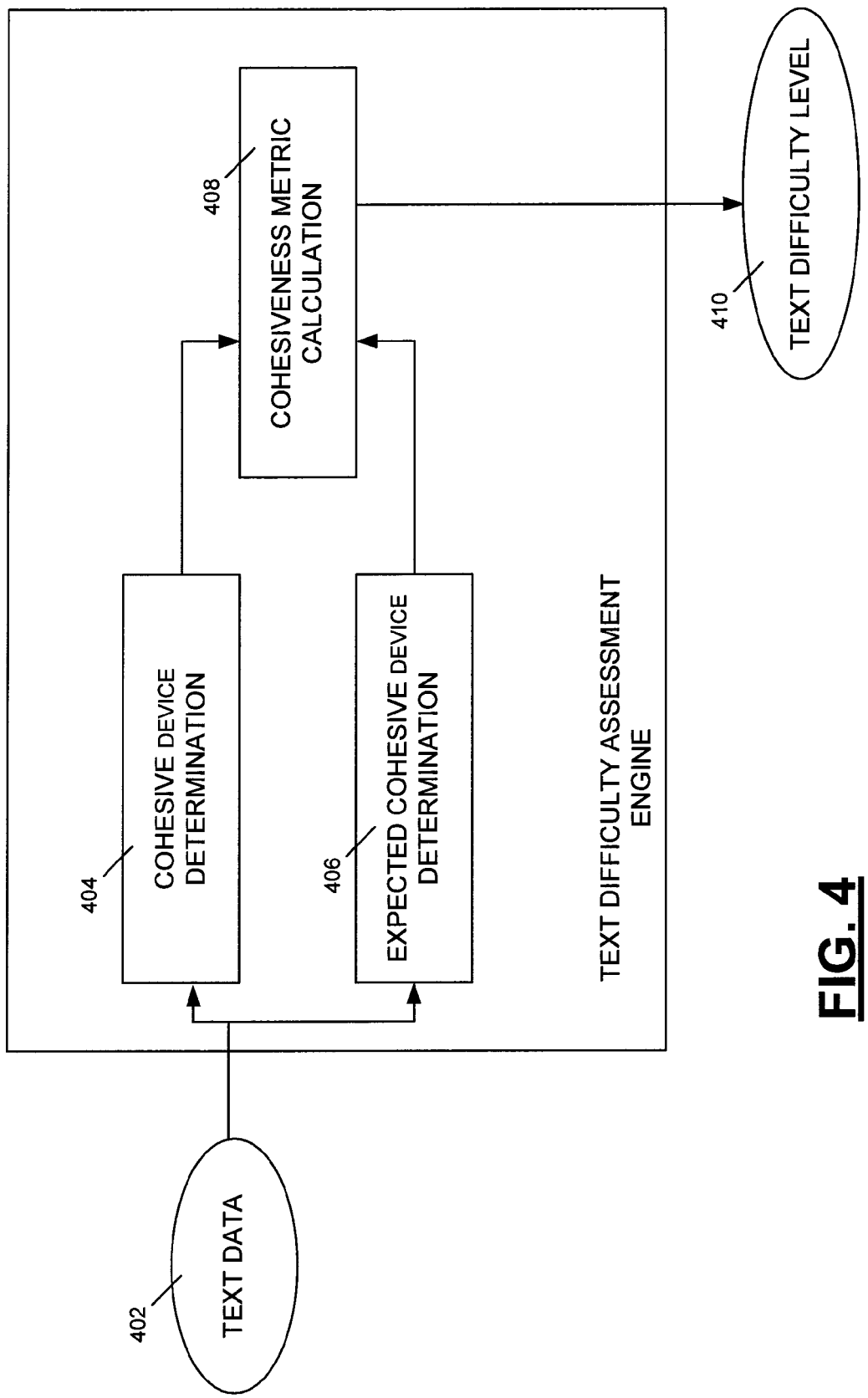
FIG. 4 is a block diagram depicting the determination of a text difficulty level using a cohesiveness metric calculation.

FIG. 4 is a block diagram depicting an exemplary determination of a text difficulty level using a cohesiveness metric calculation. Text data 402, which may include all or a portion of a text to be analyzed, is received by a processing system of a computer (e.g., with text difficulty assessment engine 102). At 404, the received text data 402 is analyzed by the processing system to determine a number of cohesive devices present in the text. In series or in parallel, a determination is made by the processing system at 406 identifying the number of cohesive devices expected in the text. For example, the expected cohesive device determination may count the number of words present in each sentence i and the preceding sentence and determine an expected likelihood that that sentence i will include a cohesive device. Those expected likelihoods can be summed across the total number of sentences to determine an expected number of cohesive devices expected in the text.

At 408, the processing system compares the number of cohesive devices determined to be in the text data 402 to the number of cohesive devices expected to be in the text data 402 to calculate a cohesiveness metric that is correlated to a difficulty level of the text. The cohesiveness metric calculated at 408 by the processing system is then used alone or in combination with other features (e.g., using a regression model) to determine a difficulty level of the text.

Figure 5:
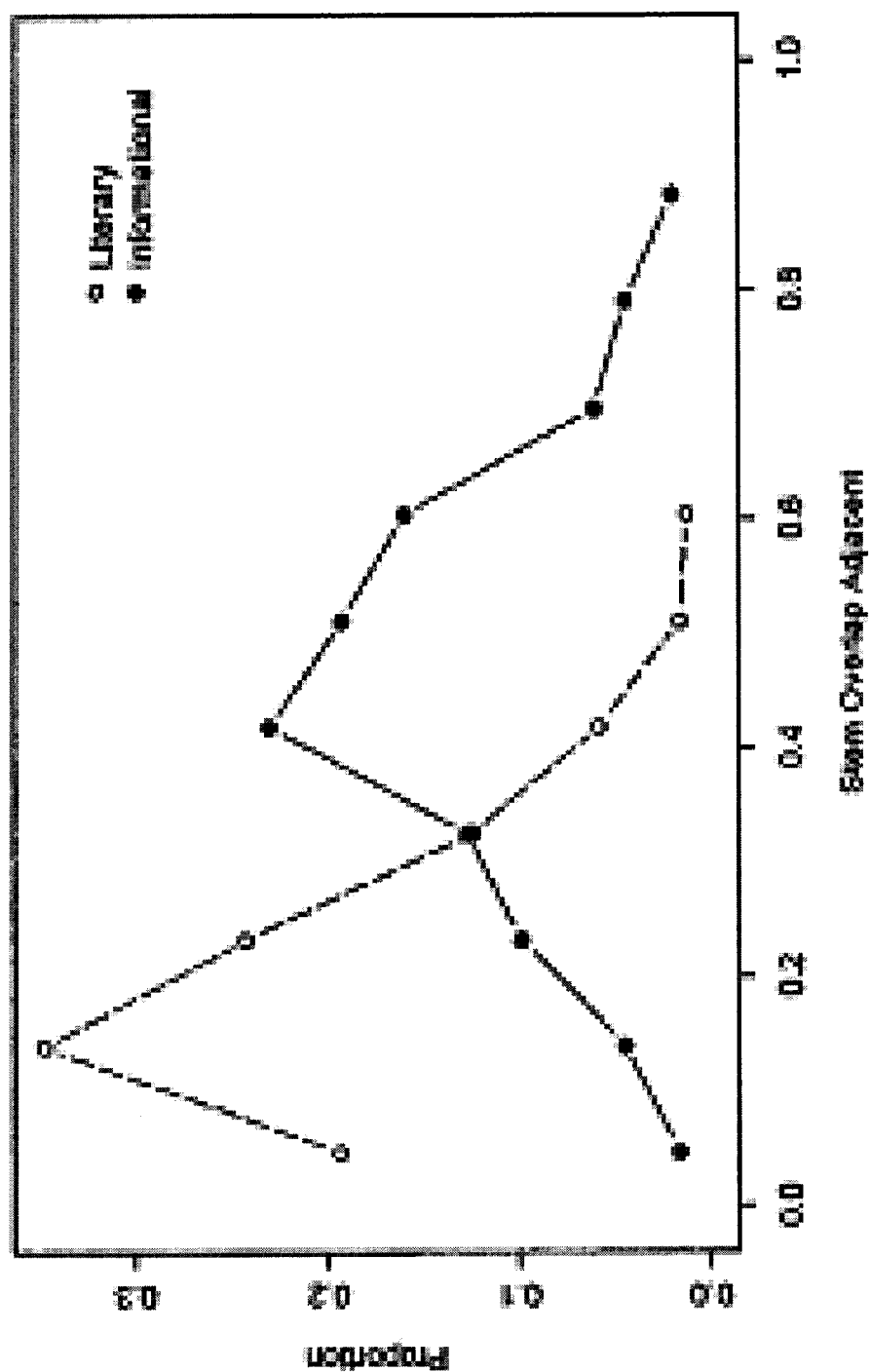
FIGS. 5 and 6 are graphs depicting tools for determining an expected likelihood that a sentence will include a cohesive device.
Figure 6:
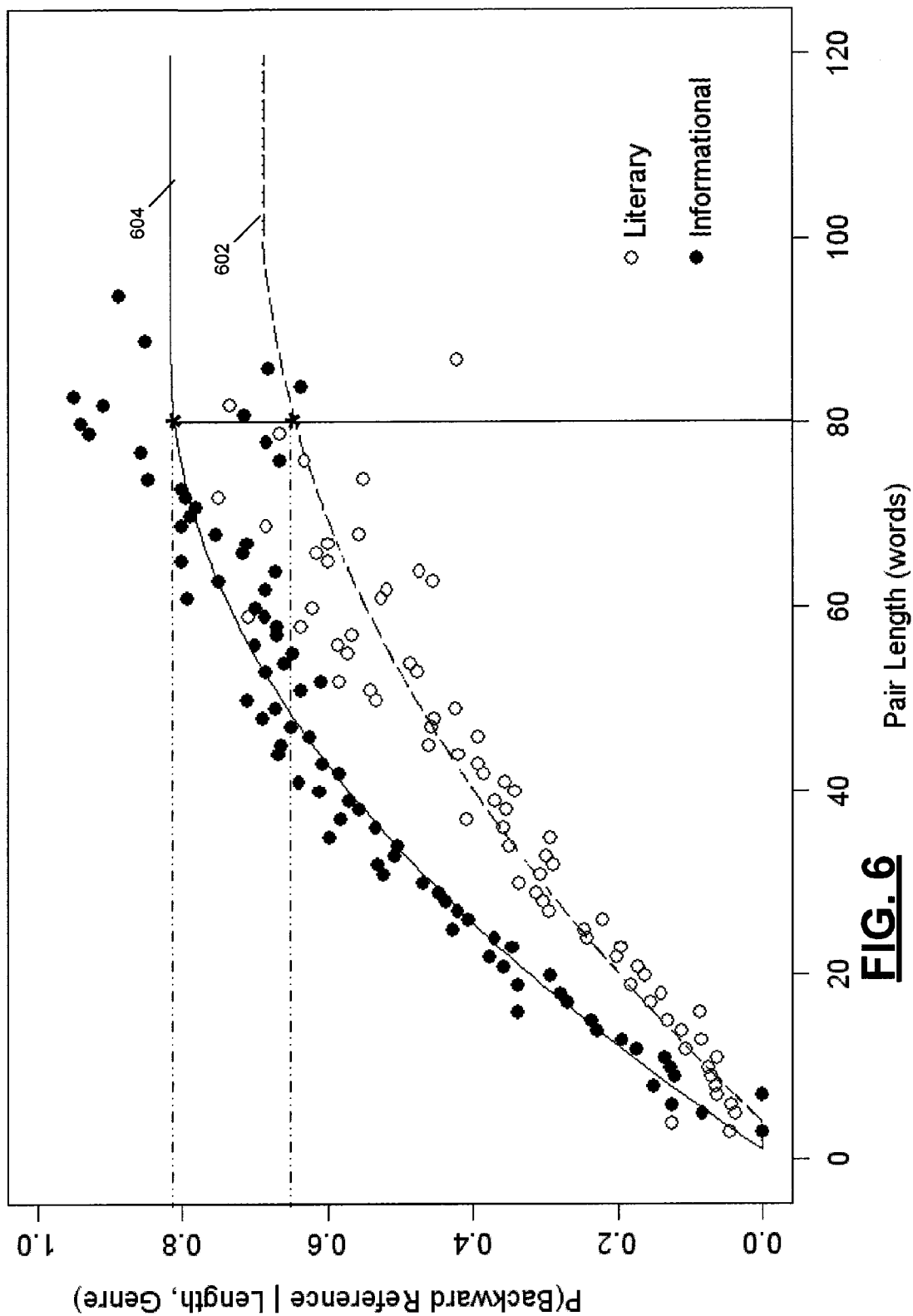

FIGS. 5 and 6 are graphs depicting correlation tools for determining an expected likelihood that a sentence will include a cohesive device. FIG. 5 is a graph depicting proportions of total sentences in literary and informational texts having different stem overlap adjacent values. A corpus of documents was reviewed in one experiment, where the documents in the corpus were categorized as either literary (e.g., fiction) or informational (e.g., non-fiction or opinion), and a determination was made as to the proportion of sentences in those texts having different calculated stem overlap adjacent metric value. As indicated in the graph of FIG. 5, a larger proportion of literary texts had lesser stem overlap adjacent metric values, signaling a lesser number of cohesive devices that would likely be expected in literary texts. In contrast, informational texts tend to have larger proportions of sentences having larger stem overlap adjacent values, and thus larger amounts of cohesive devices. Thus, additional value and accuracy may be incorporated into the determined number of cohesive devices expected in a text by utilizing expected likelihoods derived from a similar type of document as the text being analyzed for difficulty level.

FIG. 6 is a graph depicting expected likelihoods of a sentence i containing a cohesive device according to the length of the sentence i and the preceding sentence i−1 according to type of text. Such a graph may be generated by sampling large numbers of texts to determine the experimental likelihoods, depicted as the data points in FIG. 6. Curves can then be fit to the data points to generate the literary text fit 602 and the informational text fit 604. When a text is being analyzed, a total length of a sentence i and its preceding sentence i−1 is determined, and one of the two fits 602, 604 is referenced to determine an expected likelihood that sentence i will include a cohesive device. Summing these values for all of the sentences in the text provides the number of cohesive devices expected in the text. The data provided in the graph may be made available in a variety of forms, such as in graph form (such as in FIG. 6) or in table form, where expected likelihoods (P) are provided for different sentence lengths or ranges of sentence lengths of pairs of adjacent sentences.

For example, when a count of words in sentence i and sentence i+1 combined is 80 words, the expected likelihood that sentence i will include a cohesive device is determined to be 0.65 (65%) if the text is a literary text and 0.82 (82%) if the text is an informational text, as indicated in FIG. 6. In some embodiments, a single curve may be fit to the data (where two curves are shown in FIG. 6), such that the determination of an expected probability that a sentence will include a cohesive device is made without consideration of the type of text.

Figure 7:
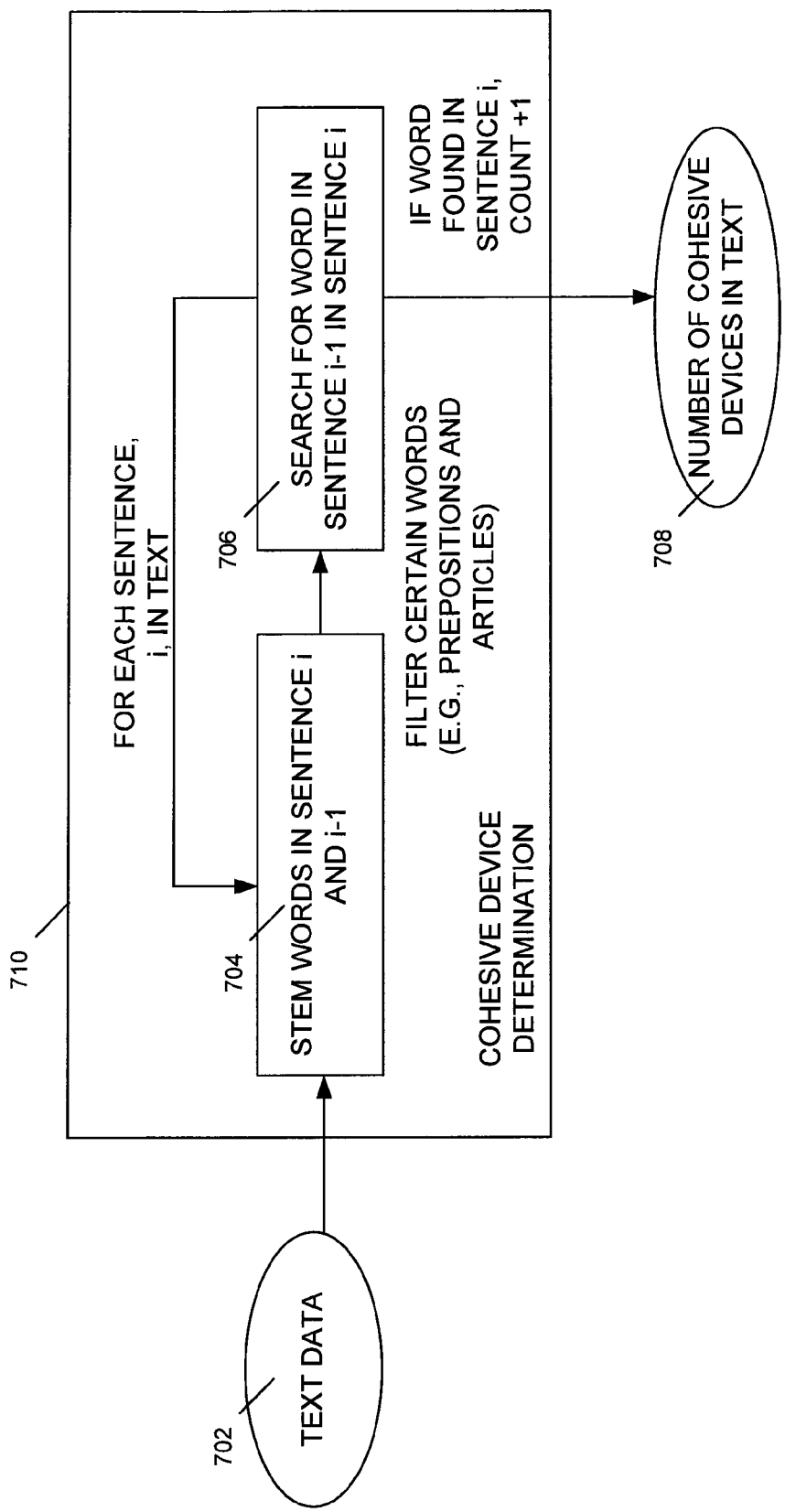
FIG. 7 is a block diagram depicting a determination of a number of cohesive devices present in a text.

FIG. 7 is a block diagram depicting another exemplary determination of a number of cohesive devices present in a text. Text data is received by a processing system at 702. Each sentence may undergo pre-processing at 704, such as performing a stemming operation on the words of the sentence to improve comparisons of words contained in neighboring sentences. The stemming operation truncates words of the sentences to retain only the root word, which tends to remain constant across multiple sentences. Additional pre-processing may include removal or ignoring of certain common words that tend not to be relevant to cohesive device identification, such as prepositions, articles, and conjunctions. In some applications, such pre-processing may be omitted. Following pre-processing, a search is performed by the processing system at 706 to identify words that are present in sentence i that are also present in sentence i−1. This repetition of a word is indicative of a cohesive device being present. If such repetition is found during the search at 706, a count of a number of cohesive devices present in the text 708 is increased. The cohesive device determination 710 is then repeated for the next sentence, sentence i+1, and its predecessor, sentence i.

In some implementations, cohesive devices may not be detected across pairs of consecutive sentences that span two paragraphs. In many situations, having distinct thoughts conveyed in different paragraphs connotes easier to understand text. Thus, in some implementations, a text may not be identified as being more difficult based on a lack of cohesive devices in pairs of sentences in disparate paragraphs.

Figure 8:
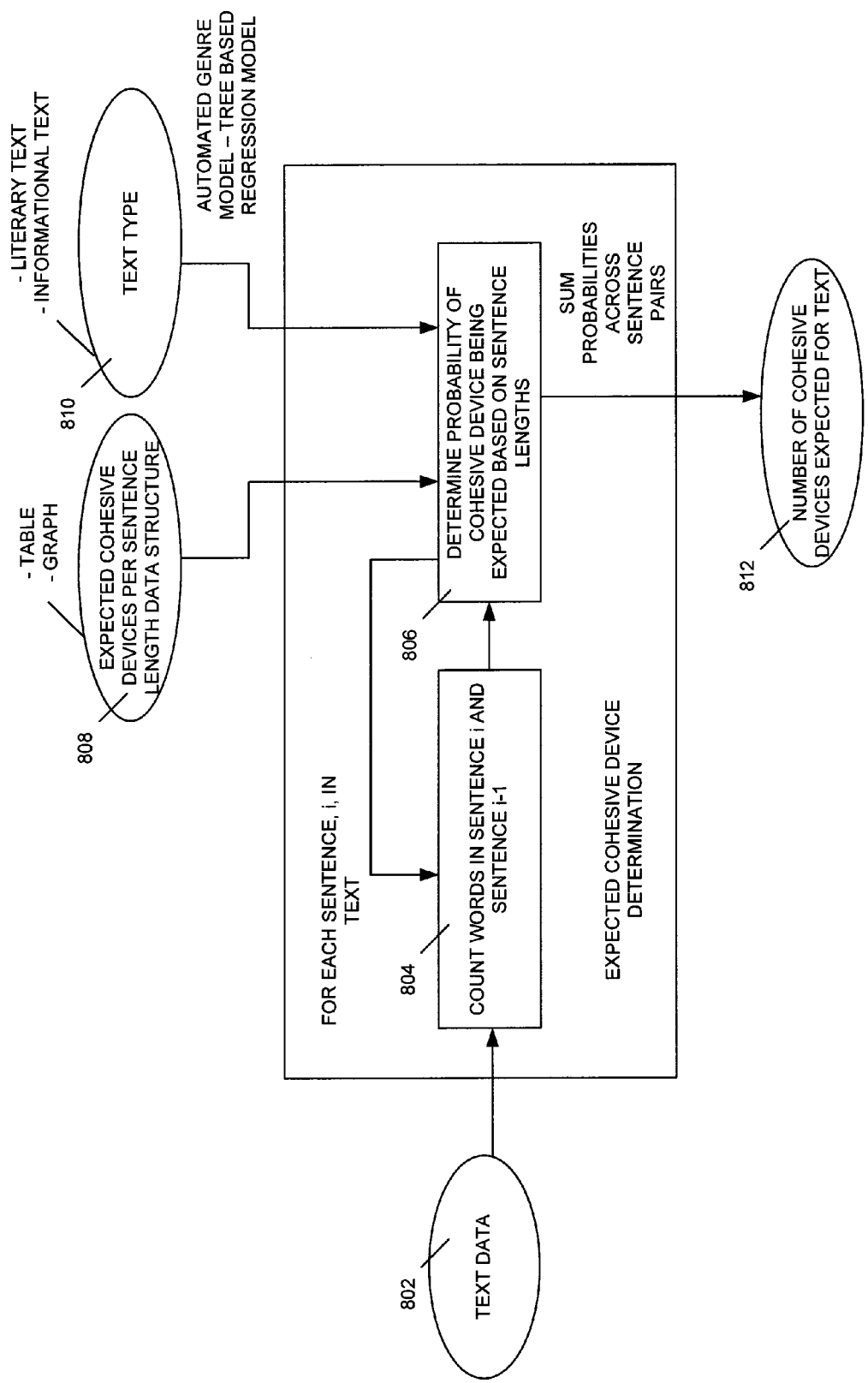
FIG. 8 is a block diagram depicting a determination of an expected number of cohesive devices in a text.

FIG. 8 is a block diagram depicting another exemplary determination of an expected number of cohesive devices in a text. Text data is received at 802. At 804, a count is performed as to the number of words in sentence i and sentence i−1. In some embodiments certain words such as articles and conjunctions may be excluded from the count. Based on the count at 804, a determination is made at 806 as to the probability of a cohesive device being present in sentence based on the length of sentence i plus the length of sentence i−1. The determination at 806 may be performed using a graph, such as the graph depicted in FIG. 6, or using a table or other device that includes the expected number of cohesive devices according to sentence length 808. In some implementations, the expected number of cohesive devices may be described in terms of the type of text associated with the text data 802, as indicated at 810. For example, a text 802 may be identified as a literary text or an informational text using an automated genre model in the form of a tree based regression model. The expected likelihood of a cohesive device being present in sentence i is included in a running sum across all sentences in the text, as indicated at 812.

Again, in some implementations, expected cohesive devices may not be determined across pairs of consecutive sentences that span two paragraphs. In many situations, having distinct thoughts conveyed in different paragraphs connotes easier to understand text. Thus, in some implementations, a text may not be identified as being more difficult based on a lack of cohesive devices in pairs of sentences in disparate paragraphs.

Having determined a number of cohesive devices present in a text and a number of cohesive devices expected in the text, those values can be used to calculate a cohesiveness metric that is indicative of a difficulty of the text. The cohesiveness metric can be calculated in multiple different ways. For example, the cohesiveness metric can be calculated as a normalization of the number of cohesive devices present in a text by an expected number of cohesive constraints expected in the text. In such an example, an adjusted stem overlap adjacent metric can be calculated as:

$$ASOA = \frac{\sum_{i=1}^{n} x_i}{\sum_{i=1}^{n} E[x_i]},$$

where n denotes a number of sentences, i denotes a present sentence, $x_i$ is a variable that takes the value $x_i=1$ when sentence i includes a cohesive device if sentence i includes a reference to sentence i−1 and where $x_i$ takes the value $x_i=0$ otherwise, $E[x_i]$ is an expected probability of a cohesive device being present in sentence i based on a length of sentence i and sentence i−1, and ASOA refers to an adjusted stem overlap adjacent metric.

Figure 9:
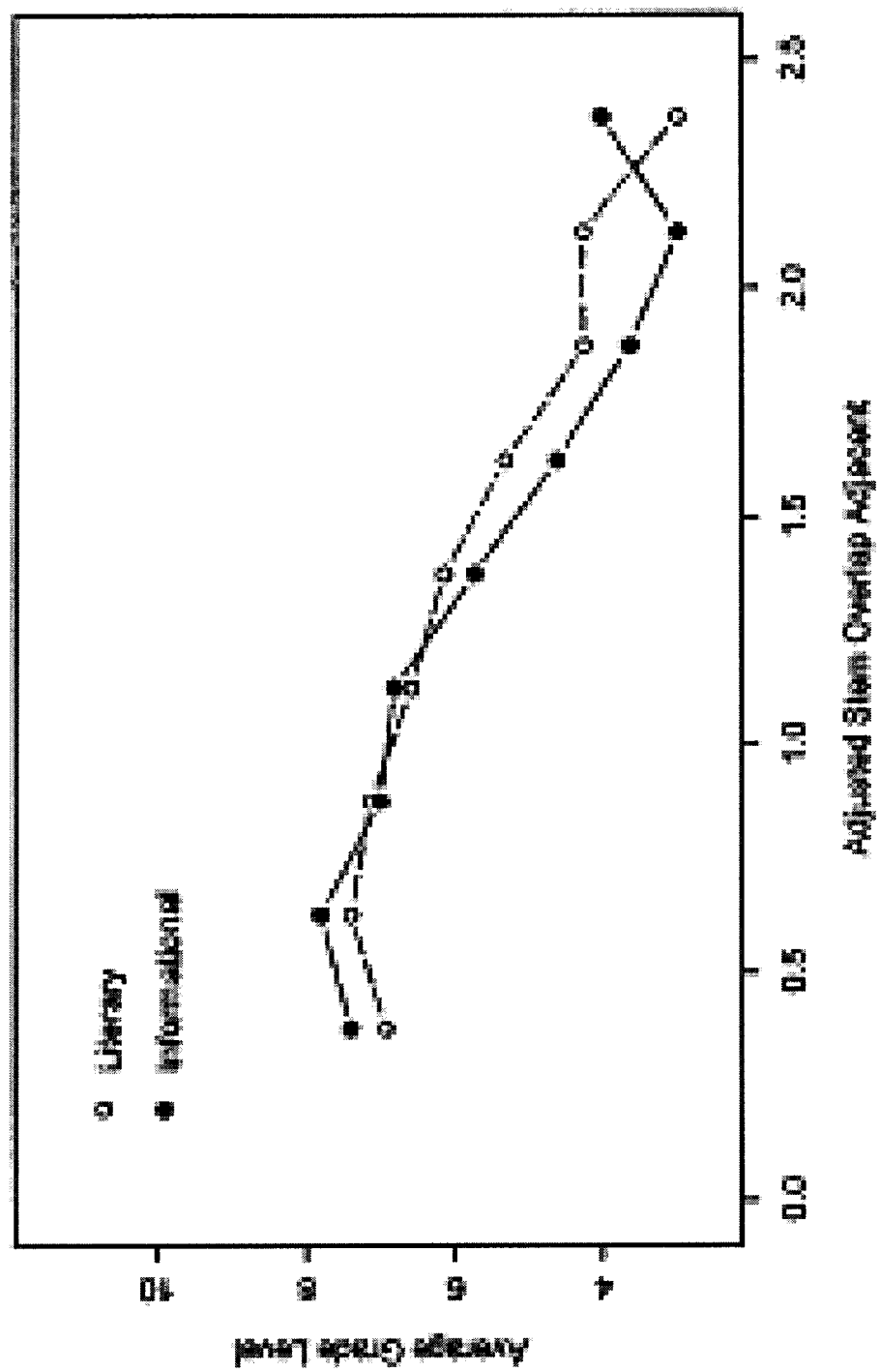
FIGS. 9 and 10 are graphs depicting a plot of average grade level difficulties according to adjusted stem overlap adjacent metrics for a corpus of documents.

FIG. 9 is a graph depicting an exemplary plot of average grade level difficulty of a text on the Y axis according to adjusted stem overlap adjacent metric values on the X axis for a corpus of documents. As indicated by the negative slope of the plots for literary and informational texts, the adjusted stem overlap adjacent metric is correlated with the difficulty of a text, such that texts having a lower number of cohesive devices per expected cohesive device are generally more difficult texts.

As another example, a cohesiveness metric may be calculated by normalizing according to a variance of the probability of a cohesive device being present in a sentence. For example, the cohesiveness metric may be calculated according to:

$$Y_A = \frac{\sum_{i \in S_A} x_i - \sum_{i \in S_A} P(x_i = 1 \mid \theta_o, \beta_i)}{\sqrt{\text{Var}\left[\sum_{i \in S_A} P(x_i = 1 \mid \theta_o, \beta_i)\right]}},$$

where $S_A$ is the set of adjacent sentences, where $x_i=1$ when sentence i includes a cohesive device where sentence i includes a reference to sentence i−1 and $x_i=0$ otherwise, and P is the expected probability of a cohesive device being present in sentence i based on a length of sentence i and sentence i−1, as estimated from a corpus of texts, and $Y_A$ refers to the cohesiveness metric.

Figure 10:
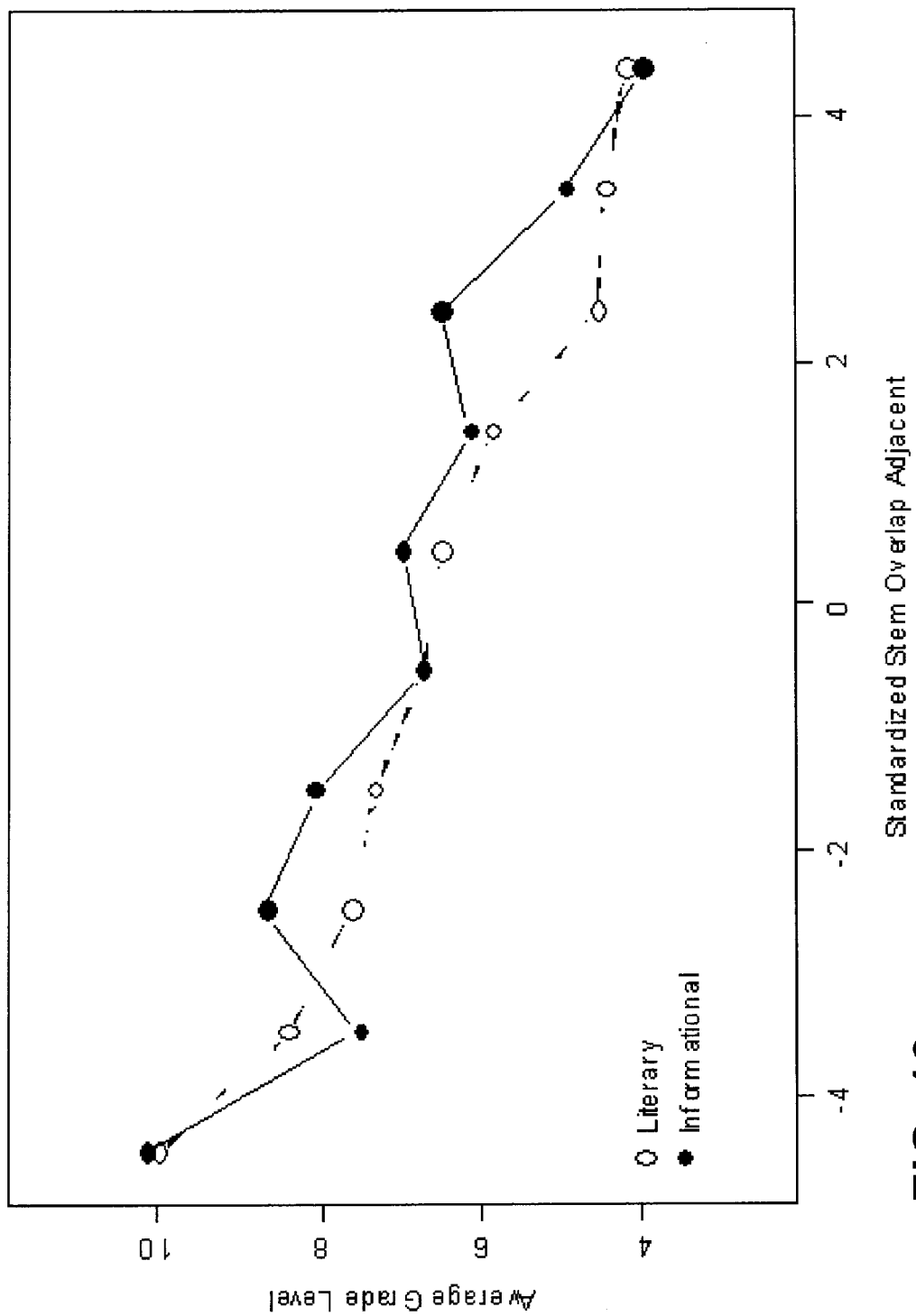

FIG. 10 is a graph depicting an exemplary plot of average grade level difficulty of a text on the Y axis according to standardized stem overlap adjacent metric values on the X axis for a corpus of documents. As indicated by the negative slope of the plots for literary and informational texts, the adjusted stem overlap adjacent metric is correlated with the difficulty of a text, such that texts having a lower number of cohesive devices per expected cohesive device are generally more difficult texts. The graph of FIG. 10 displays a strong correlation across a wide range of text difficulties, where some methods may provide less optimal results when performing determinations associated with high level or low level of difficulty texts.

Figure 11:
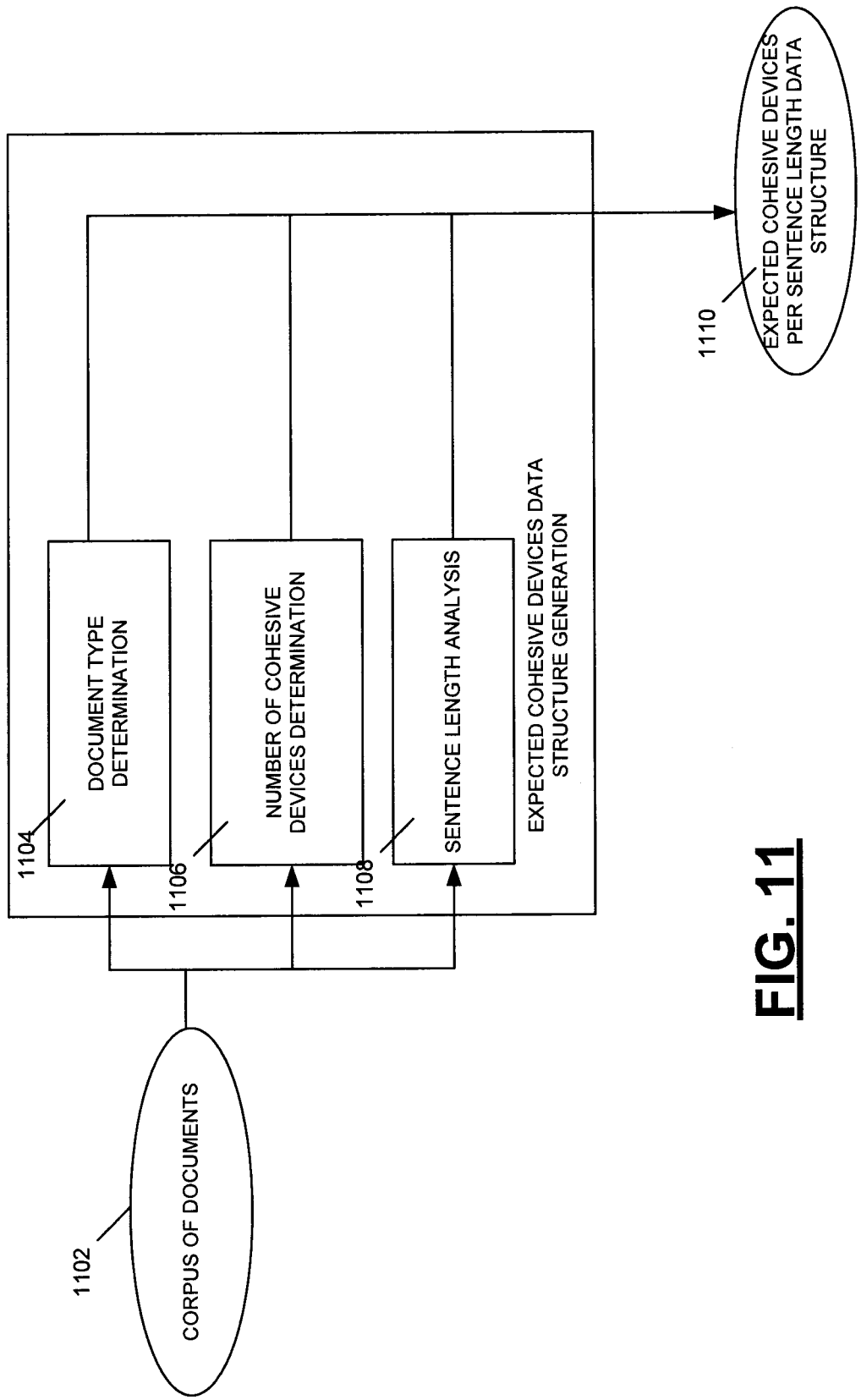
FIG. 11 is a block diagram depicting the generation of an expected cohesive devices per sentence length data structure.

FIG. 11 is a block diagram depicting exemplary generation of an expected cohesive devices per sentence length data structure. A corpus of documents is received by a processing system at 1102. For example, the corpus of documents 1102 may include a large number of texts of different types and different mediums such as books, magazine articles, periodicals, short stories, or paragraphs. At 1104, a determination is made as to the type of a particular document (e.g., informational or literary). At 1106, a determination is made as to the number of cohesive devices present in a sentence, and at 1108, a determination is made as to the length of the sentence and the preceding sentence. The number of cohesive devices and the sentence length are compiled according to document type over all of the sentences in the corpus of documents 1102 to generate a data structure 1110 that describes the expected likelihood of finding a cohesive device in a sentence based on the length of a sentence and that sentence's predecessor sentence.

Figure 12:
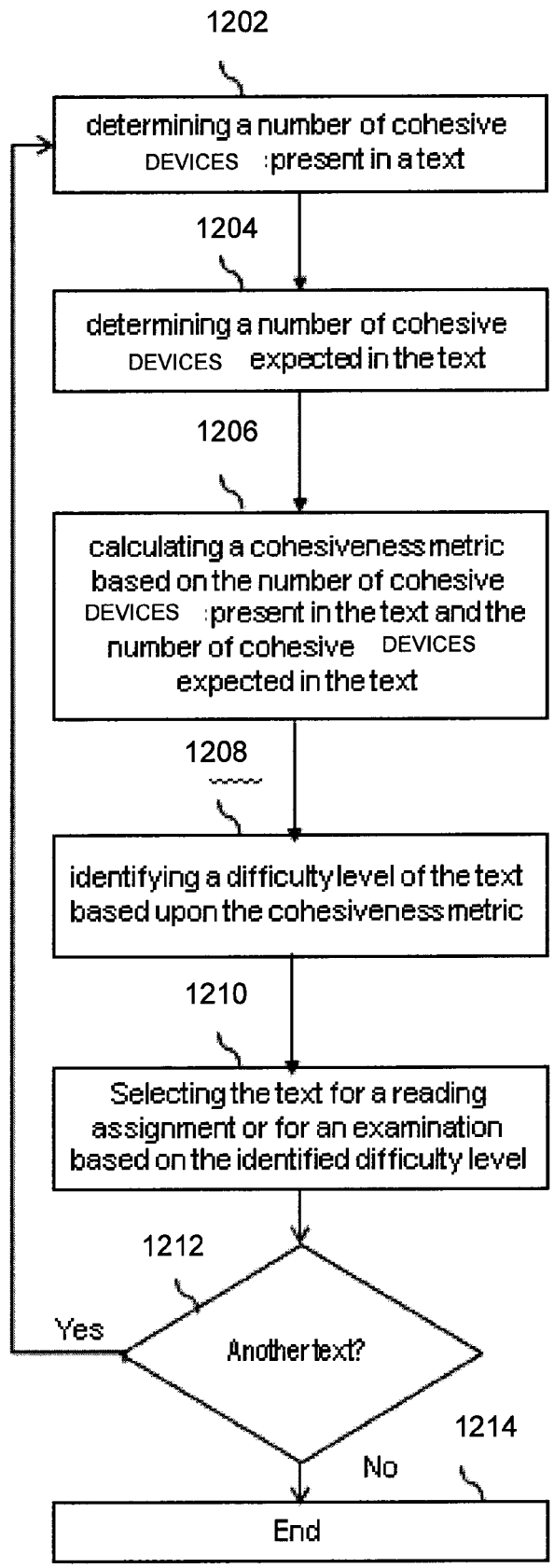
FIG. 12 is a flow diagram depicting a computer-implemented method of determining a difficulty level of a text.

FIG. 12 is a flow diagram depicting an exemplary computer-implemented method of determining a difficulty level of a text. At 1202 a number of cohesive devices present in a text is determined by a processing system. At 1204, a number of cohesive devices expected in the text is determined by the processing system. At 1206, a cohesiveness metric is calculated by the processing system based on the number of cohesive devices present in the text and the number of cohesive devices expected in the text. At 1208, a difficulty level of the text is identified by the processing system based on the cohesiveness metric, and at 1210, the text is selected for a reading assignment or for inclusion in an examination based on the identified difficulty level (e.g., chosen for use on an examination or a reading assignment or flagged as a possible candidate for an examination or reading assignment, or for some other use). At 1212, 1214, the method can repeated to assess additional texts, if present. The loop can be carried out automatically without user intervention or with intermittent user intervention/interruption to permit a user review selected texts at any given time.

Figure 13A:
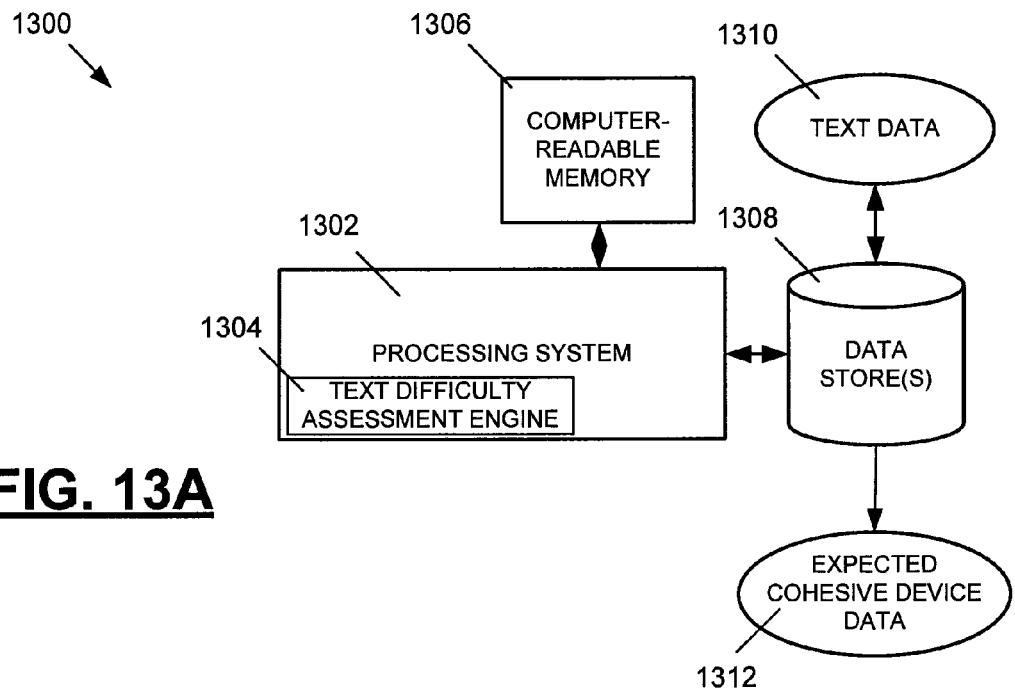
FIGS. 13A, 13B, and 13C depict example systems for use in implementing a text difficulty assessment engine.
Figure 13B:
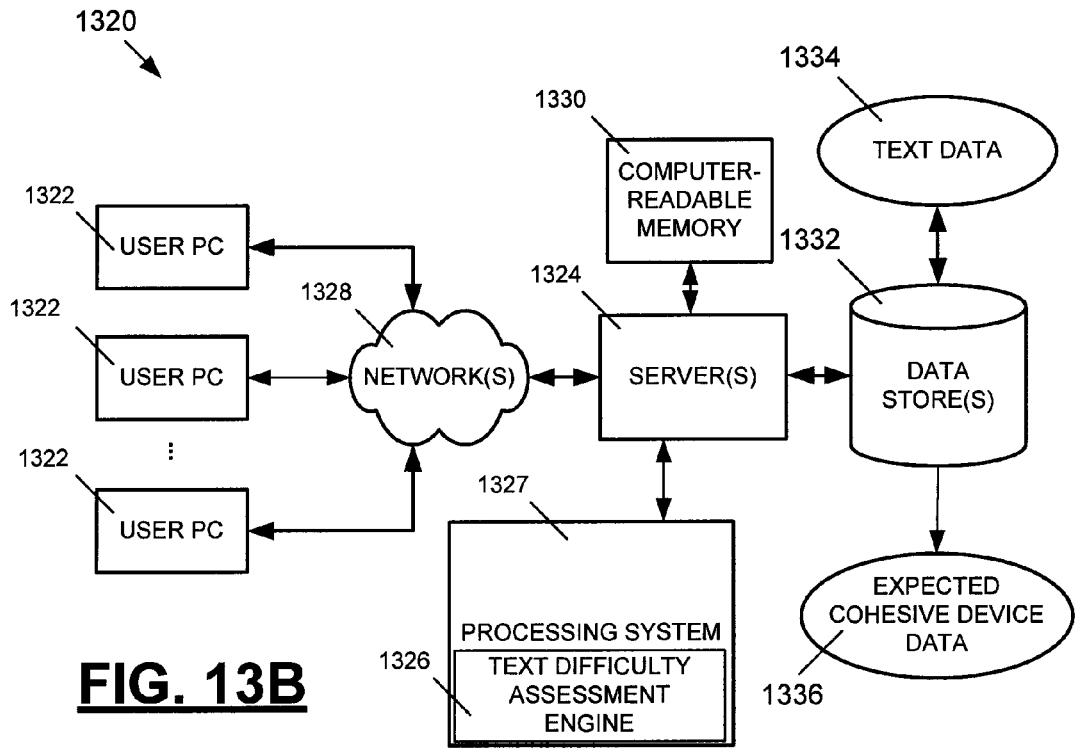
Figure 13C:
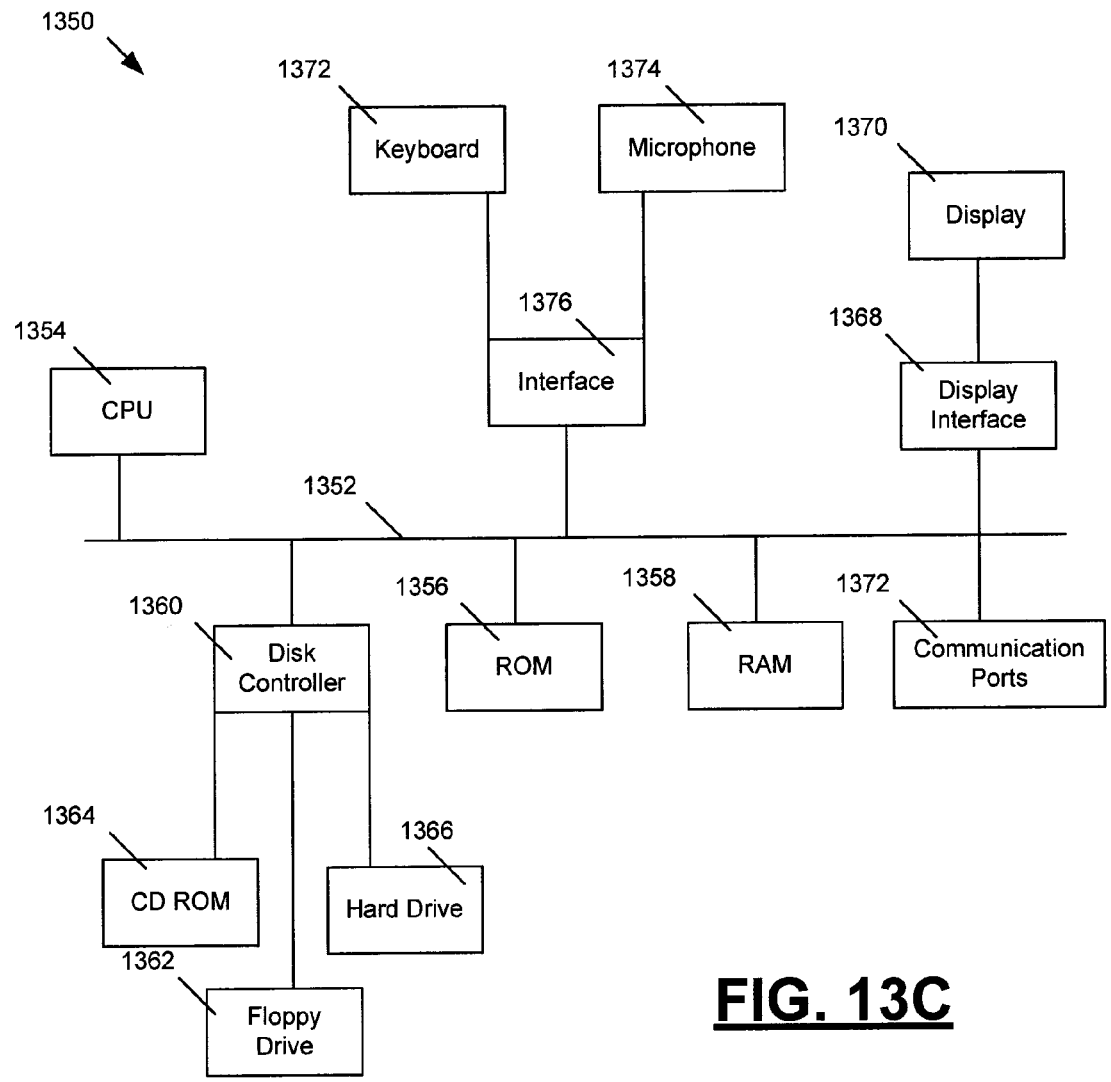

FIGS. 13A, 13B, and 13C depict example systems for use in implementing a text difficulty assessment engine. For example, FIG. 13A depicts an exemplary system 1300 that includes a standalone computer architecture where a processing system 1302 (e.g., one or more computer processors located in a given computer or in multiple computers that may be separate and distinct from one another) includes a text difficulty assessment engine 1304 being executed on it. The processing system 1302 has access to a computer-readable memory 1306 in addition to one or more data stores 1308. The one or more data stores 1308 may include text data 1310 as well as expected cohesive device data 1312.

FIG. 13B depicts a system 1320 that includes a client server architecture. One or more user PCs 1322 access one or more servers 1324 running a text difficulty assessment engine 1326 on a processing system 1327 via one or more networks 1328. The one or more servers 1324 may access a computer readable memory 1330 as well as one or more data stores 1332. The one or more data stores 1332 may contain text data 1334 as well as expected cohesive device data 1336.

FIG. 13C shows a block diagram of exemplary hardware for a standalone computer architecture 1350, such as the architecture depicted in FIG. 13A that may be used to contain and/or implement the program instructions of system embodiments of the present invention. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A processor-readable storage medium, such as read only memory (ROM) 1356 and random access memory (RAM) 1358, may be in communication with the processing system 1354 and may contain one or more programming instructions for performing the method of implementing a text difficulty assessment engine. Optionally, program instructions may be stored on a non-transitory computer readable storage medium such as a magnetic disk, optical disk, recordable memory device, flash memory, or other physical storage medium.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1352 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of determining a difficulty level of a text, comprising:
   determining with a processing system a number of cohesive devices present in a text;
   determining with the processing system a number of cohesive devices expected in the text, wherein determining the expected number of cohesive devices includes:
      for each sentence in the text having a preceding sentence in the text, determining a total number of words in that sentence and a sentence preceding that sentence to generate a sentence pair total;
      determining a sum of the sentence pair totals; and
      determining the expected number of cohesive devices based on the sum of the sentence pair totals;
   calculating with the processing system a cohesiveness metric based on the number of cohesive devices present in the text and the number of cohesive devices expected in the text; and
   identifying a difficulty level of the text based upon the cohesiveness metric.

2. The method of claim 1, wherein the cohesive devices include causal cohesion device or referential cohesion devices.

3. The method of claim 1, wherein the cohesive devices include referential cohesion devices, wherein the referential cohesion devices are identified by locating a sequential first sentence and a sequential second sentence, wherein the sequential second sentence repeats a word from the first sentence.

4. The method of claim 3, wherein the second sentence is determined to repeat a word from the first sentence when the first sentence includes a stem of the word and the second sentence also includes the stem of the word.

5. The method of claim 3, wherein repetitions of certain words are ignored when determining a number of cohesive devices present in the text.

6. The method of claim 5, wherein the ignored words are prepositions, conjunctions, and articles.

7. The method of claim 1, wherein the number of cohesive devices expected in the text is determined based on sentence lengths of sentences within the text.

8. The method of claim 7, wherein the number of cohesive devices expected in the text is determined based on total sentence lengths of consecutive sentences in the text.

9. The method of claim 1, wherein determining a number of cohesive devices expected in the text further comprises:
   determining a total number of words in a consecutive pair of sentences;
   determining a number of cohesive devices expected in the pair of consecutive sentences based on the total number of words;
   wherein the number of cohesive devices expected in the text is based on a sum of cohesive devices expected in a plurality of pairs of consecutive sentences in the text.

10. The method of claim 9, wherein the sum of cohesive devices expected does not include cohesive devices expected in pairs of consecutive sentences that span multiple paragraphs.

11. The method of claim 9, further comprising determining whether the text is a literary text or an informational text, wherein determining the number of cohesive devices expected in the pair of consecutive sentences is based on the total number of words and whether the text is a literary text or an informational text.

12. The method of claim 11, wherein the text is determined to be a literary text or an informational text automatically using a tree based regression model.

13. The method of claim 11, wherein more cohesive devices are expected per word of sentence length for informational text than literary text.

14. The method of claim 9, wherein the number of cohesive devices expected in the text is determined based on reference to a table or graph.

15. The method of claim 14, wherein the table or graph is built based on an analysis of a corpus of documents, wherein the analysis for a document includes identifying a type of text for the document, determining a number of cohesive devices in the document, and determining lengths of sentences within the document.

16. The method of claim 9, wherein the cohesiveness metric is calculated according to:

$$ASOA = \frac{\sum_{i=1}^{n} x_i}{\sum_{i=1}^{n} E[x_i]},$$

where $x_i=1$ when sentence i includes a cohesive device where sentence i includes a reference to sentence i−1, and $E[x_i]$ is an expected probability of a cohesive device being present in sentence i based on a length of sentence i and sentence i−1.

17. The method of claim 9, wherein the cohesiveness metric is calculated according to:

$$Y_A = \frac{\sum_{i \in S_A} x_i - \sum_{i \in S_A} P(x_i = 1 \mid \theta_o, \beta_i)}{\sqrt{\text{Var}\left[\sum_{i \in S_A} P(x_i = 1 \mid \theta_o, \beta_i)\right]}},$$

where $S_A$ is the set of adjacent sentences, where $x_i-1$ when sentence i includes a cohesive device where sentence i includes a reference to sentence i−1, and P is the expected probability of a cohesive device being present in sentence i based on a length of sentence i and sentence i−1, as estimated from a corpus of texts.

18. The method of claim 1, comprising selecting the text for a reading assignment based on the identified level of difficulty.

19. The method of claim 1, comprising selecting the text for inclusion on an examination based on the identified level of difficulty.

20. A computer-implemented system for determining a difficulty level of a text, comprising:
a processing system; and
a memory coupled to the processing system, wherein the processing system is configured to execute steps comprising:
determining with a processing system a number of cohesive devices present in a text;
determining with the processing system a number of cohesive devices expected in the text, wherein determining the expected number of cohesive devices includes:
for each sentence in the text having a preceding sentence in the text, determining a total number of words in that sentence and a sentence preceding that sentence to generate a sentence pair total;
determining a sum of the sentence pair totals; and
determining the expected number of cohesive devices based on the sum of the sentence pair totals;
calculating with the processing system a cohesiveness metric based on the number of cohesive devices present in the text and the number of cohesive devices expected in the text; and
identifying a difficulty level of the text based upon the cohesiveness metric.

21. A non-transitory computer-readable medium comprising programming instructions for identifying a difficulty level of a text, the programming instructions, when executed, causing a processing system to execute steps comprising:
determining with a processing system a number of cohesive devices present in a text;
determining with the processing system a number of cohesive devices expected in the text, wherein determining the expected number of cohesive devices includes:
for each sentence in the text having a preceding sentence in the text, determining a total number of words in that sentence and a sentence preceding that sentence to generate a sentence pair total;
determining a sum of the sentence pair totals; and
determining the expected number of cohesive devices based on the sum of the sentence pair totals;
calculating with the processing system a cohesiveness metric based on the number of cohesive devices present in the text and the number of cohesive devices expected in the text; and
identifying a difficulty level of the text based upon the cohesiveness metric.

* * * * *